United States Patent
Tamai et al.

(10) Patent No.: US 9,651,101 B2
(45) Date of Patent: May 16, 2017

(54) METHOD OF CONTROLLING A SELECTABLE ONE WAY LUTCH OF A TRANSMISSION

(71) Applicant: GM GLOBAL TECHNOLOGY OPERATIONS LLC, Detroit, MI (US)

(72) Inventors: Goro Tamai, West Bloomfield, MI (US); Anthony J. Corsetti, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/454,976

(22) Filed: Aug. 8, 2014

(65) Prior Publication Data
US 2016/0040734 A1   Feb. 11, 2016

(51) Int. Cl.
*F16D 48/10* (2006.01)
*B60W 30/02* (2012.01)
*F16D 48/06* (2006.01)

(52) U.S. Cl.
CPC ............ *F16D 48/10* (2013.01); *B60W 30/02* (2013.01); *F16D 48/06* (2013.01); *F16D 2500/1066* (2013.01); *F16D 2500/10493* (2013.01); *F16D 2500/30401* (2013.01); *F16D 2500/30406* (2013.01); *F16D 2500/3117* (2013.01); *F16D 2500/3118* (2013.01); *F16D 2500/3166* (2013.01); *F16D 2500/50816* (2013.01); *Y10S 903/946* (2013.01)

(58) Field of Classification Search
CPC ............................... F16D 48/10; B60W 30/01

USPC ........................................................... 701/22
See application file for complete search history.

(56) References Cited

U.S. PATENT DOCUMENTS

| | | | | |
|---|---|---|---|---|
| 2006/0025905 A1* | 2/2006 | Zhao | ............. | B60K 6/445 701/22 |
| 2007/0038340 A1* | 2/2007 | Sekiguchi | ............. | B60L 3/10 701/22 |
| 2008/0300765 A1* | 12/2008 | Kato | ............. | B60T 8/1755 701/90 |
| 2009/0098970 A1* | 4/2009 | Kimes | ............. | B60K 6/365 475/5 |
| 2011/0177900 A1* | 7/2011 | Simon | ............. | B60K 6/445 475/5 |
| 2012/0136518 A1* | 5/2012 | Samie | ............. | B60K 6/365 701/22 |
| 2012/0203403 A1* | 8/2012 | Lee | ............. | B60K 6/383 701/22 |

(Continued)

*Primary Examiner* — Yazan Soofi
(74) *Attorney, Agent, or Firm* — Quinn IP Law

(57) ABSTRACT

A method of controlling a selectable one way clutch operable to selectively couple a shaft to a housing of a transmission includes determining if an electric motor is currently operating, and if the selectable one way clutch is currently engaged to couple the shaft to the housing. It is further determined whether or not wheel torque of at least one wheel is currently being actively managed by at least one vehicle control system. When the electric motor is operating with the selectable one way clutch engaged, and wheel torque of at least one wheel of the hybrid vehicle is currently being actively managed by at least one vehicle control system, then selectable one way clutch is disengaged to release the shaft from the housing and allow rotation of the shaft relative to the housing.

20 Claims, 2 Drawing Sheets

(56) References Cited

U.S. PATENT DOCUMENTS

| | | | | |
|---|---|---|---|---|
| 2014/0335995 A1* | 11/2014 | Swales | ............... | B60W 20/00 |
| | | | | 477/3 |
| 2014/0378266 A1* | 12/2014 | Bockenstette | ............ | F16H 3/62 |
| | | | | 475/275 |
| 2015/0142232 A1* | 5/2015 | Tabata | ............... | B60K 6/445 |
| | | | | 701/22 |

* cited by examiner

METHOD OF CONTROLLING A SELECTABLE ONE WAY LUTCH OF A TRANSMISSION

TECHNICAL FIELD

The disclosure generally relates to a method of controlling a selectable one way clutch of a transmission operable to selectively couple a shaft of the transmission to a housing of the transmission to prevent rotation of the shaft relative to the housing in at least one rotational direction.

BACKGROUND

Vehicles include an engine for producing a drive torque. A transmission is attached to the engine, and typically includes an input shaft that receives the drive torque from a crank shaft of the engine. The input shaft is coupled to an output shaft of the transmission through a gear train. The output shaft is coupled to and transfers the drive torque to a driveline, which includes one or more drive wheels, to drive the vehicle.

The transmission may include several different operating modes, such as but not limited to a forward drive mode and a rearward drive mode. The transmission may or may not include a neutral drive mode, which de-couples or disconnects the drive wheels from the input shaft. The neutral mode prevents torque from being transmitted between the engine and the drive wheels when the transmission is disposed in the neutral mode. However, if the transmission is not configured to include a neutral mode, then the engine and the drive wheels are constantly disposed in torque communication. When the transmission is configured without a neutral mode, then any torque spikes introduced into the system, such as at the drive wheels, are communicated through the transmission, and the components of the transmission must be designed to handle these possible torque spikes.

SUMMARY

A method of controlling a hybrid vehicle having a transmission with a selectable one way clutch is provided. The selectable one way clutch is operable to selectively couple a shaft of the transmission to a housing of the transmission, to prevent rotation of the shaft relative to the housing in at least one rotational direction. The method includes determining if an electric motor of the hybrid vehicle is currently operating to provide a propulsive torque for the hybrid vehicle, or if the electric motor is not currently operating to provide a propulsive torque, and determining if the selectable one way clutch is currently engaged to couple the shaft to the housing, or if the selectable one way clutch is currently not engaged to allow rotation of the shaft relative to the housing. It is further determined whether or not wheel torque of at least one wheel of the hybrid vehicle is currently being actively managed by at least one vehicle control system. When the electric motor is operating with the selectable one way clutch engaged, and wheel torque of at least one wheel of the hybrid vehicle is currently being actively managed by at least one vehicle control system, then the selectable one way clutch is disengaged to release the shaft from the housing and allow rotation of the shaft relative to the housing.

Accordingly, in response to one of the vehicle control systems being actuated to actively manage wheel torque, such as but not limited to an anti-lock brake system, a vehicle stability enhancement system, or a traction control system, the selectable one way clutch may be disengaged to allow the shaft to rotate relative to the housing so that an excessive amount of torque is not transferred to the transmission through one of the drive wheels of the vehicle, thereby preventing damage to the components of the transmission. Additionally, by disengaging the selectable one way clutch when conditions exist that may introduce excessive torque into the transmission, the size of the components of the transmission may be reduced.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
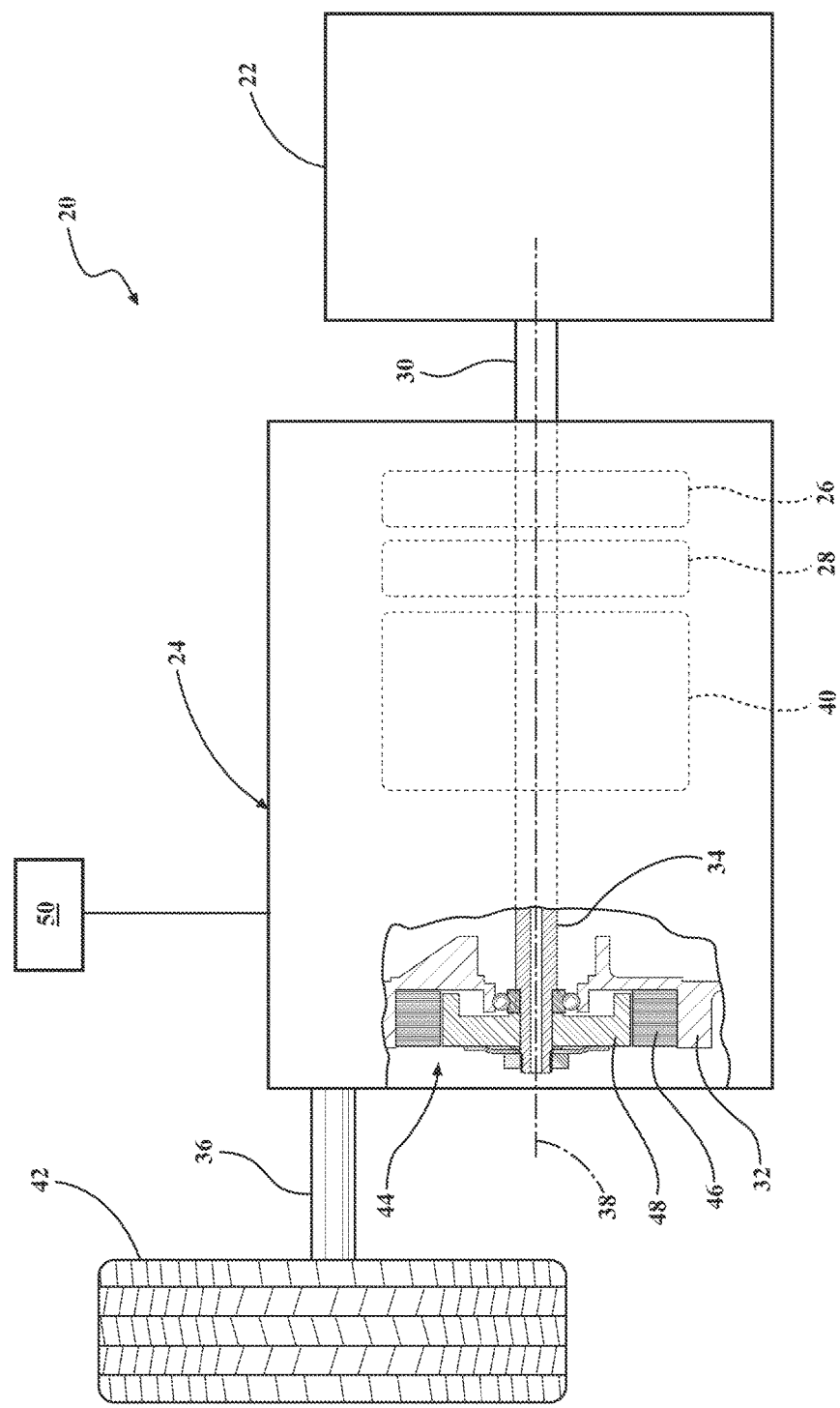
FIG. 1 is a schematic diagram of a hybrid vehicle showing a partially cross sectioned transmission.

Referring to the Figures, wherein like numerals indicate like parts throughout the several views, a hybrid vehicle is schematically shown at 20 in FIG. 1. Referring to FIG. 1, the hybrid vehicle 20 includes an engine 22 coupled to a transmission 24. The transmission 24 may include one or more electric motors. As shown, the transmission 24 includes a first electric motor 26 and a second electric motor 28. The engine 22 may include, but is not limited to, an internal combustion engine 22 such as a gasoline or a diesel engine 22. The engine 22 includes a crank shaft 30, which is operable to output a drive torque. The transmission 24 includes a housing 32, which rotatably supports a shaft for rotation about an axis. The shaft may include an input shaft 34, an output shaft 36, or an intermediate shaft (not shown). The written description below refers to the shaft as the input shaft 34. However, the scope of the claims should not be limited to the exemplary embodiment of the input shaft 34. The input shaft 34 is rotatable about an input axis 38. The input shaft 34 is coupled to the crankshaft for receiving the drive torque from the engine 22. Additionally and/or alternatively, the first electric motor 26 and the second electric motor 28 may output the drive torque to the input shaft 34 of the transmission 24. The transmission 24 transfers the drive torque from the input shaft 34 to the output shaft 36 via a gear train 40. At least one drive wheel 42 is coupled to the output shaft 36 of the transmission 24 in torque communication therebetween. The transmission 24 transfers the drive torque to the drive wheel 42 through the output shaft 36.

The transmission 24 may include a forward drive mode and a rearward drive mode. The transmission 24 may or may not include a neutral mode. Accordingly, the transmission 24 may not include a true mechanical neutral for de-coupling the drive wheels 42 from the input shaft 34 of the transmission 24, to prevent torque communication between the drive wheel 42 and the input shaft 34 of the transmission 24. Furthermore, the transmission 24 does not include a friction clutch that is operable to limit torque transfer between the drive wheel 42 and the input shaft 34.

The transmission 24 includes a selectable one way clutch 44, which interconnects the housing 32 and the input shaft 34. It should be appreciated that if the shaft of the transmission 24 is defined as the output shaft 36 or the intermediate shaft, then the selectable one way clutch 44 would interconnect the housing 32 and the output shaft 36 or the intermediate shaft respectively. The selectable one way clutch 44 is selectively operable to prevent rotation of the input shaft 34 about the input axis 38 in at least one rotational direction. The selectable one way clutch 44 may include any device that is capable of selective engagement to control or limit rotation of the input shaft 34 in one or both rotational directions about the input axis 38. The selectable one way clutch 44 may alternatively be referred to as a shaft brake of the transmission 24.

The selectable one way clutch 44 includes a fixed portion 46 that is fixedly attached to the housing 32, and a rotatable portion 48 that is attached to the input shaft 34 for rotation with the input shaft 34 about the input axis 38. The rotatable portion 48 and the fixed portion 46 are controlled to selectively engage and/or disengage the selectable one way clutch 44. When the selectable one way clutch 44 is engaged, the rotatable portion 48 interacts with the fixed portion 46 in a manner that limits or prevents rotation of the input axis 38 in at least one direction. When the selectable one way clutch 44 is disengaged, the rotatable portion 48 does not interact with the fixed portion 46, thereby allowing the rotatable portion 48 to rotate with the input shaft 34 about the input axis 38 in either rotational direction. The selectable one way clutch 44 may be controlled to limit rotation of the input shaft 34 in either a clockwise direction, a counter-clockwise direction, or both the clockwise and counterclockwise directions, either individually or simultaneously.

The hybrid vehicle 20 may include a control module, such as but not limited to a transmission control unit 50, to control the operation of the transmission 24 and the selectable one way clutch 44. The control module may include a computer and/or processor, and include all software, hardware, memory, algorithms, connections, sensors, etc., necessary to manage and control the operation of the transmission 24 and the selectable one way clutch 44. As such, a method, described below and generally shown in FIG. 2 at 100, may be embodied as a program or algorithm operable on the control module. It should be appreciated that the control module may include any device capable of analyzing data from various sensors, comparing data, making the necessary decisions required to control the operation of the transmission 24 and the selectable one way clutch 44, and executing the required tasks necessary to control the operation of the transmission 24 and the selectable one way clutch 44.

Because the transmission 24 may not include a neutral mode, and does not include a friction clutch that may be slipped to limit torque transfer between the drive wheels 42 and the input shaft 34 of the transmission 24, the control algorithm, which implements the method described in greater detail below, is operable on the transmission control unit 50 of the vehicle 20 to control the engagement and disengagement of the selectable one way clutch 44, to limit torque transfer between the drive wheels 42 and the input shaft 34 of the transmission 24, thereby protecting the input shaft 34 of the transmission 24 from torque spikes, such as may occur when spinning drive wheels 42 suddenly contact dry pavement and introduce a torque spike into the drive system.

Figure 2:
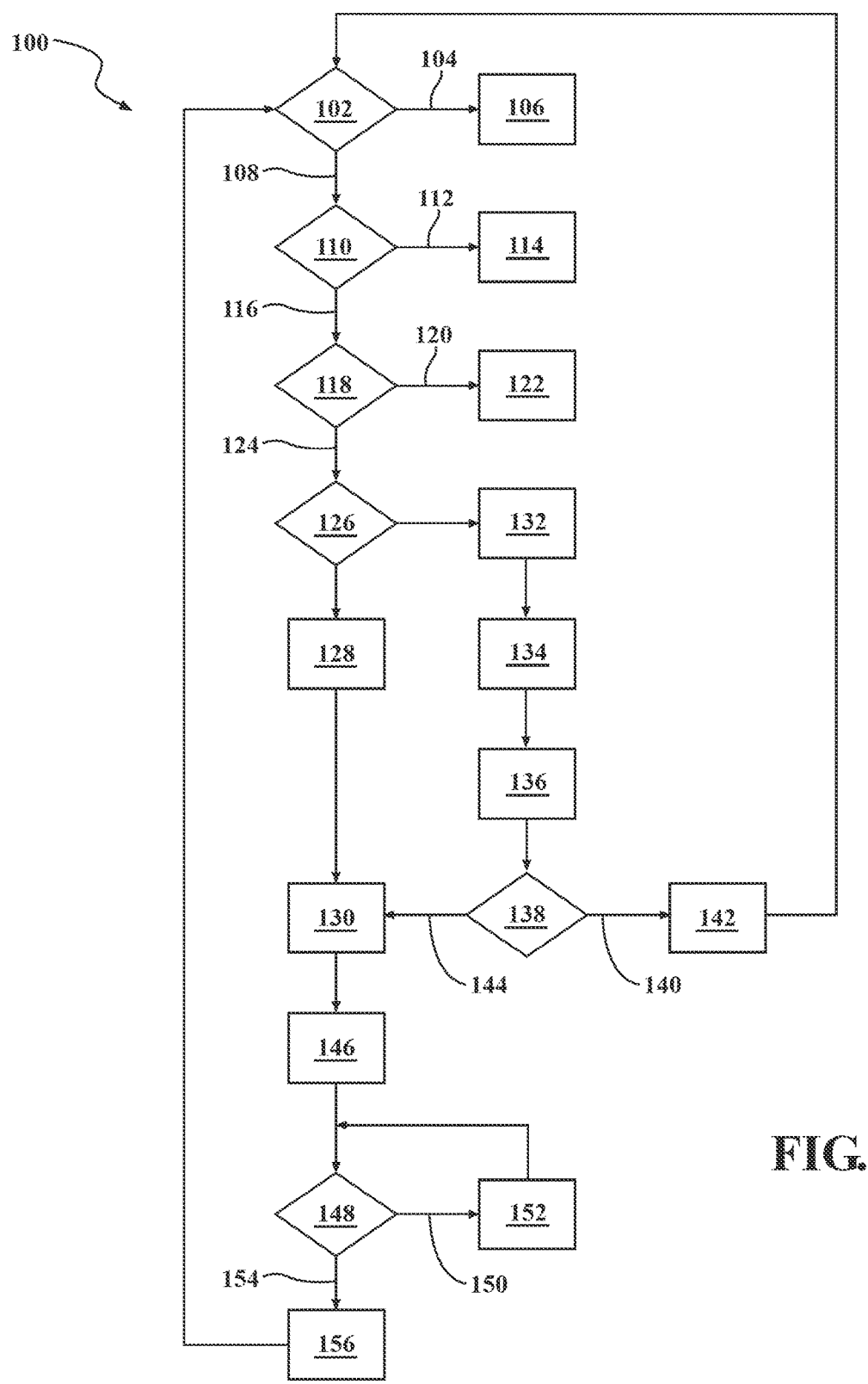
FIG. 2 is a flowchart representing a method of controlling the hybrid vehicle.

Referring to FIG. 2, the method 100 may include determining, generally indicated by decision box 102, if an electric motor of the hybrid vehicle 20, e.g., the first electric motor 26 and/or the second electric motor 28 of the exemplary embodiment shown in FIG. 1, is currently operating to provide a propulsive torque for the hybrid vehicle 20, or if the electric motor is not currently operating to provide a propulsive torque. The propulsive torque is defined herein as torque that is applied to the drive wheels 42 of the hybrid vehicle 20 to move or propel the hybrid vehicle 20. The transmission control unit 50 may determine whether the electric motor(s) is or is not operating to provide the propulsive torque in any suitable manner, such as but not limited to querying and/or monitoring the electric motor(s). If the transmission control unit 50 determines that the electric motor is not currently operating to provide the propulsive torque for the hybrid vehicle 20, generally indicated at 104 then the transmission control unit 50 does not take any further action, generally indicated by box 106.

If the transmission control unit 50 determines that the electric motor is currently operating to provide the propulsive torque for the hybrid vehicle 20, generally indicated at 108, then the transmission control unit 50 determines, generally indicated by decision box 110, if the selectable one way clutch 44 is currently engaged to couple the shaft to the housing 32, or if the selectable one way clutch 44 is currently not engaged to allow free or uninterrupted rotation of the shaft relative to the housing 32. The step of determining 102 if an electric motor of the hybrid vehicle 20 is currently operating to provide a propulsive torque for the hybrid vehicle 20, or if the electric motor is not currently operating to provide a propulsive torque is optional. As such, the method may directly begin with the step of determining 110 if the selectable one way clutch 44 is currently engaged to couple the shaft to the housing 32, or if the selectable one way clutch 44 is currently not engaged to allow free or uninterrupted rotation of the shaft relative to the housing 32. The transmission control unit 50 may determine whether the selectable one way clutch 44 is engaged or is not engaged in any suitable manner, such as but not limited, to monitoring a position sensor of the selectable one way clutch 44. If the transmission control unit 50 determines that the selectable one way clutch 44 is not engaged, generally indicated at 112, then the transmission control unit 50 does not take any further action, generally indicated by box 114.

If the transmission control unit 50 determines that the selectable one way clutch 44 is engaged, generally indicated at 116, then the transmission control unit 50 determines, generally indicated by decision box 118, if wheel 42 torque of at least one wheel 42 of the hybrid vehicle 20 is currently being actively managed by at least one vehicle control system. The at least one vehicle control system may include any vehicle control system operable to manage wheel 42 torque. For example, the vehicle control system may include, but is not limited to, an anti-lock brake system, a vehicle 20 stability enhancement system, and/or a traction control system. The transmission control unit 50 may determine if wheel 42 torque of at least one of the wheels 42 of the hybrid vehicle 20 is currently being actively managed by one of the vehicle control systems in any suitable manner, such as by querying one or more vehicle 20 control modules to monitor the operation and/or activity of the vehicle control systems. If the transmission control unit 50 determines that wheel 42 torque of one or more wheels 42 of the hybrid vehicle 20 is not currently being actively managed by at least one of the vehicle control systems, generally indicated at 120, then the transmission control unit 50 takes no further action, generally indicated by box 122.

If the transmission control unit 50 determines that wheel 42 torque of one or more wheels 42 of the hybrid vehicle 20 is currently being actively managed by at least one vehicle control system, generally indicated at 124, then the transmission control unit 50 may disengage the selectable one way clutch 44 to release the shaft from the housing 32 and allow rotation of the shaft relative to the housing 32. Accordingly, when the electric motor is operating to provide the propulsive torque, with the selectable one way clutch 44 engaged, and wheel 42 torque of at least one wheel 42 of the hybrid vehicle 20 is currently being actively managed by one of the vehicle's control systems, then the transmission control unit 50 may disengage the selectable one way clutch 44 to de-couple the shaft from the housing 32 of the transmission 24. By disengaging the selectable one way clutch 44, the shaft is protected from torque spikes that may be introduced into the transmission 24 via one or more of the wheels 42 of the hybrid vehicle 20.

If the transmission control unit 50 determines that wheel 42 torque of at least one wheel 42 of the hybrid vehicle 20 is currently being actively managed by one of the vehicle control systems, generally indicated at 124, then the transmission control unit 50 determines, generally indicated by decision box 126, which vehicle control system is currently actively managing the wheel 42 torque of the hybrid vehicle 20. If the transmission control unit 50 determines that either the anti-lock brake system or the vehicle 20 stability enhancement system are currently actively managing wheel 42 torque, generally indicated by box 128, then the transmission control unit 50 may automatically disengage, generally indicated by box 130, the selectable one way clutch 44. Accordingly, when the electric motor is operating to provide the propulsive torque for the hybrid vehicle 20, with the selectable one way clutch 44 engaged, and wheel 42 torque of at least one wheel 42 of the hybrid vehicle 20 is currently being actively managed by at least one of the anti-lock brake system or the vehicle 20 stability enhancement system, then the transmission control unit 50 may automatically disengage the selectable one way clutch 44.

If the transmission control unit 50 determines that wheel 42 torque of the wheels 42 of the hybrid vehicle 20 is not currently being actively managed by either the anti-lock brake system or the vehicle 20 stability enhancement system, then the transmission control unit 50 determines if wheel 42 torque of at least one of the wheels 42 is currently being actively managed by the traction control system.

If the transmission control unit 50 determines that at least one wheel 42 is currently being actively managed by the traction control system, generally indicated by box 132 then the transmission control unit 50 defines a slip threshold value, generally indicated by box 134, and measures an actual wheel 42 slip of the at least one wheel 42 of the hybrid vehicle 20 that is currently being actively managed by the traction control system, generally indicated by box 136. The slip threshold value is defined herein as the maximum amount of allowable wheel 42 slip that may be allowed with the selectable one way clutch 44 engaged. The actual wheel 42 slip is the amount or speed at which the tire of the wheel 42 is slipping relative to the ground surface. Typically, the actual wheel 42 slip may be measured in revolutions per minute (rpm's). The actual wheel 42 slip may be determined by the transmission control unit 50, for example, based upon a wheel 42 speed as measured by a wheel 42 speed sensor, and the speed of the vehicle 20.

The transmission control unit 50 then compares the absolute value of the actual wheel 42 slip of the at least one wheel 42 to the slip threshold value to determine, generally indicated by decision box 138, if the absolute value of the actual wheel 42 slip is equal to or less than the slip threshold value, or is greater than the slip threshold value. Because the actual wheel 42 slip may be in a forward direction, i.e., positive, or a reverse direction, i.e., negative, the actual wheel 42 slip may be either a positive or negative value. Accordingly, by taking the absolute value of the actual measured wheel 42 slip, the transmission control unit 50 may accurately compare the magnitude of the actual measured wheel 42 slip to the slip threshold value, without considering the direction of the wheel 42 slip. It should be appreciated that the transmission control unit 50 may compare the measured actual wheel 42 slip to the slip threshold value in some other manner, which does not require calculating the absolute value of the measured actual wheel 42 slip, such as for example, by defining the slip threshold value to be a positive value or a negative value depending upon the rotational direction of the measured actual wheel 42 slip.

If the transmission control unit 50 determines that the measured actual wheel 42 slip is equal to or less than the slip threshold value, generally indicated at 140, then the transmission control unit 50 maintains engagement of the selectable one way clutch 44, generally indicated by box 142. Accordingly, when the absolute value of the actual wheel 42 slip of the at least one wheel 42 of the hybrid vehicle 20 is equal to or less than the slip threshold value, the transmission control unit 50 maintains engagement of the selectable one way clutch 44. However, if the transmission control unit 50 determines that the measured actual wheel 42 slip is greater than the slip threshold value, generally indicated at 144, then the transmission control unit 50 disengages the selectable one way clutch 44, generally indicated by box 130. Accordingly, when the electric motor is operating to provide the propulsive torque for the hybrid vehicle 20 with the selectable one way clutch 44 engaged, wheel 42 torque of at least one wheel 42 of the hybrid vehicle 20 is currently being actively managed by the traction control system, and the absolute value of the actual wheel 42 slip of at least one wheel 42 of the hybrid vehicle 20 is greater than the slip threshold value, then the transmission control unit 50 disengages the selectable one way clutch 44.

When the selectable one way clutch 44 is disengaged, and if the hybrid vehicle 20 is equipped with more than one electric motor, such as the exemplary embodiment shown in FIG. 1 that includes the first electric motor 26 and the second electric motor 28, then the hybrid vehicle 20 may have to re-balance, generally indicated by box 146, a torque output from the first electric motor 26 and a torque output from the second electric motor 28, to achieve a desired transmission 24 output torque. Without the selectable one way clutch 44 engaged, and with both the first electric motor 26 and the second electric motor 28 operating to provide propulsive torque, there exists only a single combination of torque outputs from the first electric motor 26 and the second electric motor 28 to achieve the desired transmission 24 output torque of the hybrid vehicle 20. Accordingly, when the transmission control unit 50 disengages the selectable one way clutch 44, the hybrid vehicle 20 may be required to re-balance, i.e., adjust, the output torque from each of the first electric motor 26 and the second electric motor 28 to achieve the desired transmission 24 output torque.

After the selectable one way clutch 44 has been disengaged, the transmission control unit 50 maintains the disengagement of the selectable one way clutch 44 for a pre-determined period of time. The pre-determined period of time may be defined as any suitable period of time. The pre-determined period of time is the minimum amount of time that the transmission control unit 50 maintains disengagement of the selectable one way clutch 44 for. Accordingly, the transmission control unit 50 does not re-engage the selectable one way clutch 44 prior to the expiration of the pre-determined period of time.

After the pre-determined period of time has expired, and before re-engagement of the selectable one way clutch 44, the transmission control unit 50 may determine, generally indicated by decision box 148, if wheel 42 torque of at least one wheel 42 of the hybrid vehicle 20 is currently being actively managed by at least one vehicle control system. If the transmission control unit 50 determines that wheel 42 torque from at least one wheel 42 is still currently being actively managed by at least one of the vehicle control systems, generally indicated at 150, then the transmission control unit 50 does not re-engage the selectable one way clutch 44, i.e., the disengagement of the selectable one way clutch 44 is maintained, generally indicated by box 152. After expiration of the pre-determined period of time, and when the transmission control unit 50 determines that wheel 42 torque from at least one wheel 42 is not still currently being actively managed by at least one of the vehicle control systems, generally indicated at 154, then the transmission control unit 50 may re-engage, generally indicated by box 156, the selectable one way clutch 44 to selectively couple the shaft to the housing 32 of the transmission 24, and prevent rotation of the shaft in at least one direction relative to the housing 32.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a hybrid vehicle having a transmission with a selectable one way clutch operable to selectively couple a shaft of the transmission to a housing of the transmission to prevent rotation of the shaft relative to the housing in at least one rotational direction, the method comprising:
   determining if wheel torque of at least one wheel of the hybrid vehicle is currently being actively managed by at least one vehicle control system; and
   disengaging the selectable one way clutch to release the shaft from the housing and allow rotation of the shaft relative to the housing when wheel torque of at least one wheel of the hybrid vehicle is currently being actively managed by the at least one vehicle control system.

2. The method set forth in claim 1 wherein the at least one vehicle control system includes at least one of an anti-lock brake system, a vehicle stability enhancement system, or a traction control system.

3. The method set forth in claim 2 wherein disengaging the selectable one way clutch when wheel torque of at least one wheel of the hybrid vehicle is currently being actively managed by the at least one vehicle control system, is further defined as disengaging the selectable one way clutch when wheel torque of at least one wheel of the hybrid vehicle is currently being actively managed by at least one of the anti-lock brake system or the vehicle stability enhancement system.

4. The method set forth in claim 2 wherein disengaging the selectable one way clutch when wheel torque of at least one wheel of the hybrid vehicle is currently being actively managed by at least one vehicle control system, is further defined as disengaging the selectable one way clutch when wheel torque of at least one wheel of the hybrid vehicle is currently being actively managed by the traction control system, and an absolute value of an actual wheel slip of at least one wheel of the hybrid vehicle is greater than a slip threshold value.

5. The method set forth in claim 4 further comprising defining a slip threshold value.

6. The method set forth in claim 4 further comprising comparing the absolute value of the actual wheel slip of the at least one wheel to the slip threshold value to determine if the absolute value of the actual wheel slip is equal to or less than the slip threshold value, or is greater than the slip threshold value.

7. The method set forth in claim 4 further comprising measuring the actual wheel slip of the at least one wheel of the hybrid vehicle.

8. The method set forth in claim 4 further comprising maintaining engagement of the selectable one way clutch when the absolute value of the actual wheel slip of the at least one wheel of the hybrid vehicle is equal to or less than the slip threshold value.

9. The method set forth in claim 1 further comprising maintaining the disengagement of the selectable one way clutch for a pre-determined period of time after disengaging the selectable one way clutch.

10. The method set forth in claim 9 further comprising determining if wheel torque of at least one wheel of the hybrid vehicle is currently being actively managed by at least one vehicle control system, after expiration of the pre-determined period of time, and before re-engagement of the selectable one way clutch.

11. The method set forth in claim 10 further comprising re-engaging the selectable one way clutch, after expiration of the pre-determined period of time, and when wheel torque of the at least one wheel is not currently being actively managed by at least one vehicle control system.

12. The method set forth in claim 1 wherein the electric motor includes a first electric motor and a second electric motor, and wherein the method further comprises re-balancing a torque output from the first electric motor and a torque output from the second electric motor to achieve a desired transmission output torque when the selectable one way clutch is disengaged.

13. The method set forth in claim 1 further comprising determining if an electric motor of the hybrid vehicle is currently operating to provide a propulsive torque for the hybrid vehicle, or is not currently operating to provide a propulsive torque.

14. The method set forth in claim 13 wherein disengaging the selectable one way clutch to release the shaft from the housing and allow rotation of the shaft relative to the housing when wheel torque of at least one wheel of the hybrid vehicle is currently being actively managed by at least one vehicle control system, is further defined as disengaging the selectable one way clutch to release the shaft from the housing and allow rotation of the shaft relative to the housing when the electric motor is operating to provide the propulsive torque, and wheel torque of at least one wheel of the hybrid vehicle is currently being actively managed by at least one vehicle control system.

15. A method of controlling a selectable one way clutch for a shaft of a transmission of a hybrid vehicle, the method comprising:
   determining if the selectable one way clutch is currently engaged to couple a shaft of the transmission to a housing of the transmission, or if the selectable one way clutch is currently not engaged to allow rotation of the shaft relative to the housing;
   determining if wheel torque of at least one wheel of the hybrid vehicle is currently being actively managed by at least one of an anti-lock brake system, a vehicle stability enhancement system, or a traction control system;
   disengaging the selectable one way clutch to release the shaft from the housing and allow rotation of the shaft relative to the housing when wheel torque of at least one wheel of the hybrid vehicle is currently being actively managed by at least one of the anti-lock brake system, or the vehicle stability enhancement system; and
   disengaging the selectable one way clutch to release the shaft from the housing and allow rotation of the shaft relative to the housing when wheel torque of at least one wheel of the hybrid vehicle is currently being actively managed by the traction control system, and an absolute value of an actual wheel slip of at least one wheel of the hybrid vehicle is greater than a slip threshold value.

16. The method set forth in claim 15 further comprising measuring the actual wheel slip of the at least one wheel of the hybrid vehicle.

17. The method set forth in claim 16 further comprising defining a slip threshold value.

18. The method set forth in claim 17 further comprising comparing the absolute value of the actual wheel slip of the at least one wheel to the slip threshold value to determine if the absolute value of the actual wheel slip is equal to or less than the slip threshold value, or is greater than the slip threshold value.

19. The method set forth in claim 15 further comprising maintaining engagement of the selectable one way clutch when the absolute value of the actual wheel slip of the at least one wheel of the hybrid vehicle is equal to or less than the slip threshold value.

20. The method set forth in claim 19 further comprising:
   determining if wheel torque of at least one wheel of the hybrid vehicle is currently being actively managed by at least one vehicle control system, after expiration of a pre-determined period of time, and before re-engagement of the selectable one way clutch; and
   re-engaging the selectable one way clutch, after expiration of the pre-determined period of time, and when wheel torque of the at least one wheel is not currently being actively managed by at least one vehicle control system.

* * * * *

UNITED STATES PATENT AND TRADEMARK OFFICE
CERTIFICATE OF CORRECTION

Page 1 of 1

PATENT NO. : 9,651,101 B2
APPLICATION NO. : 14/454976
DATED : May 16, 2017
INVENTOR(S) : Goro Tamai and Anthony J. Corsetti It is certified that error appears in the above-identified patent and that said Letters Patent is hereby corrected as shown below:

On the Title Page

The title and in the Specification, Column 1, Line 1-3, "METHOD OF CONTROLLING A SELECTABLE ONE WAY LUTCH OF A TRANSMISSION" should read --METHOD OF CONTROLLING A SELECTABLE ONE WAY CLUTCH OF A TRANSMISSION--

Signed and Sealed this
Seventeenth Day of April, 2018

Andrei Iancu
*Director of the United States Patent and Trademark Office*